United States Patent
Egner et al.

(10) Patent No.: US 6,223,041 B1
(45) Date of Patent: Apr. 24, 2001

(54) DYNAMIC RADIO RESOURCE ALLOCATION IN A WIRELESS COMMUNICATION SYSTEM

(75) Inventors: Will A. Egner, Plano; Vasant Prabhu, Arlington, both of TX (US)

(73) Assignee: Nortel Networks LTD, Montreal (CA)

( * ) Notice: Subject to any disclaimer, the term of this patent is extended or adjusted under 35 U.S.C. 154(b) by 0 days.

(21) Appl. No.: 09/121,210

(22) Filed: Jul. 23, 1998

Related U.S. Application Data
(60) Provisional application No. 60/054,971, filed on Aug. 6, 1997.

(51) Int. Cl.[7] .............................. H04Q 7/20; H04B 7/00
(52) U.S. Cl. ...................... 455/452; 455/450; 455/453; 455/509; 455/513
(58) Field of Search ..................................... 455/450, 451, 455/452, 453, 445, 446, 447, 501, 513, 560, 561, 509, 62, 63

(56) References Cited

U.S. PATENT DOCUMENTS

| | | | |
|---|---|---|---|
| 5,134,709 | * | 7/1992 | Bi et al. ................. 455/452 |
| 5,448,621 | * | 9/1995 | Knudsen ................. 455/452 |
| 5,448,750 | * | 9/1995 | Eriksson et al. ............ 455/452 |
| 5,752,194 | * | 5/1998 | Lin et al. ................. 455/452 |
| 5,901,356 | * | 5/1999 | Hudson .................. 455/452 |
| 6,023,622 | * | 2/2000 | Plaschke et al. ............ 455/452 |
| 6,023,623 | * | 2/2000 | Benkner et al. ............ 355/452 |
| 6,049,717 | * | 4/2000 | Dufour et al. ............. 455/452 |

* cited by examiner

*Primary Examiner*—Dwayne D. Bost
*Assistant Examiner*—Raymond B. Persino
(74) *Attorney, Agent, or Firm*—Bruce E. Garlick; James A. Harrison

(57) ABSTRACT

In a wireless communication system, radio resources are dynamically assigned among a plurality of intercoupled base stations based upon historical loading to reduce both localized and system interference. A plurality of loading intervals are first determined that span a loading interval sequence. The loading intervals may correspond to time based periods such as fifteen-minute, thirty-minute, hour or other time intervals. The loading interval sequence may correspond to a weekday, a weekend day or such other loading period within which loading resembles a pattern. Based upon estimated loading for the loading interval, a number of channels required to service load for the loading interval are made to meet a minimal service level is determined. An initial assignment of channels among the cells/sectors of the base stations of the wireless communication system is then made to satisfy localized radio interference criteria. Such an assignment will typically be made to preclude local reuse of channels. Then, the assignments are reconsidered from the standpoint of system interference and the channels are reassigned to minimize system interference. In reassigning channels among the cells/sectors, radio propagation and, cell/sector proximity are considered so as to most accurately predict performance when the assignments are implemented. Once the channel assignments have been determined for the loading interval sequence(s), the wireless communication system is operated according to the channel assignments.

27 Claims, 10 Drawing Sheets

DYNAMIC RADIO RESOURCE ALLOCATION IN A WIRELESS COMMUNICATION SYSTEM

CROSS-REFERENCE To RELATED APPLICATION

The present application claims priority pursuant to 35 U.S.C. Sec. 119(e) to U.S. Provisional Application Serial No. 60/054,971, filed Aug. 6, 1997, pending, which is hereby incorporated herein by reference in its entirety.

BACKGROUND

1. Technical Field

The invention relates generally to wireless communication systems; and more particularly to a wireless communication system and an associated method of operation in which radio resources are dynamically allocated to reduce system interference within the wireless communication system.

2. Related art

A wireless communication system is generally known in the art to service wireless communications with wireless mobile units operating within a respective service area. The construction of a wireless communication system typically includes a plurality of base stations dispersed throughout the service area. The base stations couple to base station controllers, with each base station controller serving a plurality of base stations. Each base station controller couples to a mobile switching center that also couples to the public switched telephone network and to other mobile switching centers. When being serviced, the mobile units establish wireless communications with one or more of the base stations.

The wireless communication system operates within an allocated frequency band. The allocated frequency band is subdivided into a plurality of channels with each channel occupying a respective bandwidth of the frequency band. Each of the base stations is allocated at least one channel in which all communications with proximate mobile units are carried. In most wireless communication systems, each base station supports a plurality of sectors, with each sector allocated at least one channel. Allocation of channels is performed so that the base stations can adequately service each of the mobile units operating in their proximity.

The capacity of prior wireless communication systems was fixed. Base stations and the supporting infrastructure was initially installed and channels were assigned to service a projected loading across the systems. As loading increased, additional base stations were installed and/or additional channels were allocated to existing base stations to service the additional load. Such initial allocations and subsequent additional allocations for each cell/sector were made to serve a peak loading interval for the respective cell/sector.

However, loading patterns do not correspond to the fixed capacity of prior wireless communication systems. As is known, loading across any wireless communication system varies significantly by time of day and day of week with such loading patterns not being proportional across the system. Some portions of the system are more heavily loaded during working hours, some during evening hours, some during commuting hours and some over the weekend. Thus, because resources within the wireless communication system are deployed to meet the greatest loading period for each base station/sector within the wireless communication system, substantial resources remain unused during most loading periods. These allocated resources are extremely expensive and, when not fully used to service calls, generate no revenue for the service provider. Further, when additional channels are allocated, system interference is increased. Thus, it has been advantageous for most operators of wireless communication systems to deploy minimal resources that provide a minimal acceptable service quality during most time periods but unacceptable service quality during peak loading periods.

Thus, there is a need in the art for a wireless communication system and method of operation that manages resources to assign resources when capacity is needed, does not assign the resources when they are not needed, and manages such assignments to minimize interference within the system to maximize grade of service.

SUMMARY OF THE INVENTION

Thus, in order to overcome the above-described shortcomings and additional shortcomings related to radio resource assignment in a wireless communication system, the method and apparatus of the present invention dynamically assigns radio resources (channels) among a plurality of intercoupled base stations based upon historical loading so as to reduce both localized and system interference.

According to the method, a plurality of loading intervals are first determined that span a loading interval sequence. The loading intervals may correspond to time based periods such as fifteen-minute, thirty-minute, hour or other time intervals. The loading interval sequence may correspond to a weekday, a weekend day or such other loading period within which loading resembles a pattern. Once the loading intervals and the loading interval sequence are determined, an analysis is made for each loading interval so that a channel assignment is made that reduces localized and system interference.

Each loading interval is considered separately in making the channel assignments. When considering a particular loading interval, estimated loading for each base station cell/sector for the loading interval is first determined. Such loading patterns typically are obtained from previously gathered loading information for each base station cell/sector of the wireless communication system. Then, a number of channels required to service the load for the loading interval are determined for each cell/sector to meet a minimal service level.

Once channel requirements have been determined, an initial assignment of channels among the cells/sectors of the base stations of the wireless communication system is made to satisfy localized radio interference criteria. Such an assignment will typically be made to preclude local reuse of channels. Then, the assignments are reconsidered from the standpoint of system interference and the channels are reassigned to minimize system interference. In reassigning channels among the cells/sectors, radio propagation and, cell/sector proximity are considered so as to most accurately predict performance when the assignments are implemented.

Once the channel assignments have been determined for the loading interval sequence(s), the wireless communication system is operated according to the channel assignments. With the dynamic radio allocation, significant savings over static radio assignments are realized. Because, for any loading interval, fewer radio channel allocations are required system resources are conserved and grade of service is met using a smaller resource set. Further, because fewer radio resources are allocated, voice quality increases through the decrease of interference from radio channels which are not be needed during a particular period.

Moreover, other aspects of the present invention will become apparent with further reference to the drawings and specification which follow.

DETAILED DESCRIPTION OF THE DRAWINGS

Figure 1A:
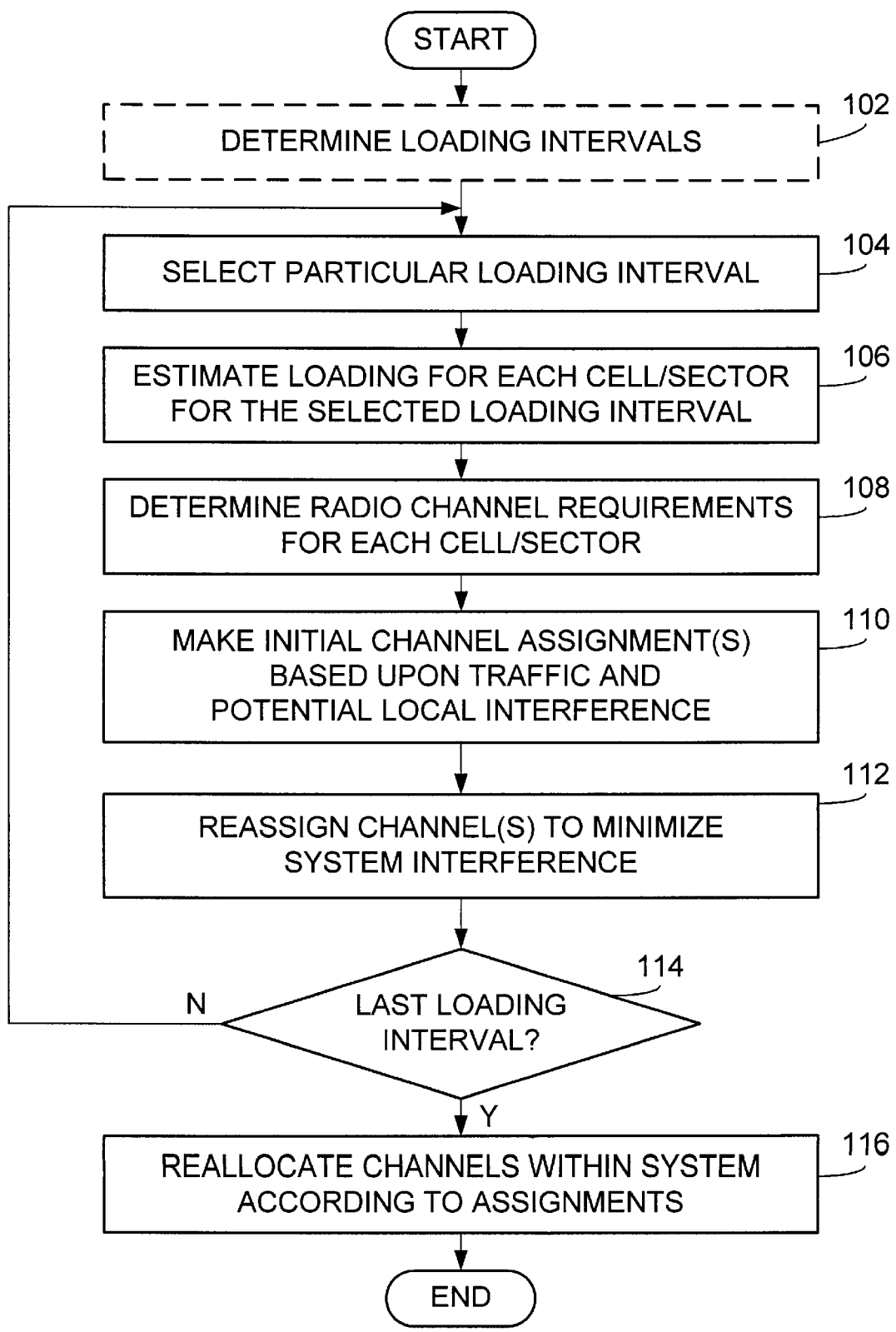
FIG. 1A is a logic diagram illustrating a method for dynamically allocating radio resources according to the present invention.

FIG. 1A illustrates a method for dynamically allocating radio resources within a wireless communication system according to the present invention. According to the method, radio resources (channels) are allocated and reallocated dynamically to provide sufficient capacity to handle expected load and also to reduce interference within the system to increase system performance. The steps described with reference to FIG. 1A detail the manner in which the radio resources are first assigned and then allocated. Based upon the assignments, the actual radio resources of the system (also referred to herein as "network") are managed according to the allocation. The steps of FIG. 1A will also be described with reference to FIGS. 2 through 4.

Operation commences at optional step 102 wherein loading intervals are determined. In an alternate operation, loading intervals have previously been determined. Each loading interval corresponds to a period during which a particular channel assignment will be determined and allocated. The loading intervals typically correspond to periods of time. When the loading intervals correspond to time periods, the loading intervals start at a particular time, stop at a particular time and have a particular duration. Durations of the loading intervals may be, for example, multiple-hours, one-hour, half-hour, fifteen-minute or other lengths of time. The loading intervals are linked so that at any time during the operation of the system, a particular loading interval is selected. Loading intervals established to span a period of time are referred to as a "loading interval sequence."

Loading interval sequences may be repeated over time for similar operating conditions. For example, in one embodiment, loading intervals each have a one-hour duration and twenty-four loading intervals establish a loading interval sequence that spans a day. Because load within the system is substantially similar for all weekdays, the twenty-four loading interval sequence is repeated for weekdays. Further, because load within the system is substantially similar for weekend days, a second loading interval sequence repeats for each weekend day.

Loading intervals that make up a loading interval sequence may also have unequal durations. The duration of loading intervals may be selected so that load is substantially uniform during each particular loading interval. As one will appreciate, relatively shorter loading interval durations are required when loading is ramping up or down but relatively longer loading interval durations may be employed when loading levels are relatively constant.

Once the loading intervals have been determined at optional step 102, steps 104 through 114 are executed for each loading interval. At step 104, a particular loading interval is selected. Upon a first execution of step 104, a first loading interval of a loading interval sequence is selected. Upon subsequent executions of step 104, subsequent loading intervals of the loading interval sequence are selected. In one example of operation according to the present invention, loading patterns repeat for each weekday and for each weekend day. Each loading interval has a duration of one hour. Thus, in such case, steps 104 through 114 are executed a total of twenty-four times for the weekday loading interval sequence and a total of twenty-four times for the weekend day loading interval sequence.

Operation then moves to step 106 wherein loading for each cell/sector under consideration in the wireless communication system is estimated for the subject loading interval. Demand estimation is based upon actual traffic usage in a wireless communication system under consideration. Current cellular traffic patterns are approximately periodic based on day of week and time of day. Therefore, traffic patterns are predicted based on recent usage patterns. In one embodiment of the method of the present invention, loading estimation assumes that traffic demand follows an M/M/N/N queue model. The model is valid for call patterns that have Poisson arrival statistics and exponentially distributed service times. The model also assumes that the call arrival process is not affected by number of calls in progress.

Next, at step 108, radio channel requirements are determined for each cell/sector of the wireless communication system for the loading interval. In determining the radio channel requirements for each cell/sector, a minimum grade of service (GOS) must be met. To meet the minimum grade of service, a minimum number of channels must be provided. Thus, estimated loading determined at step 106 is related to grade of service (GOS). Then, a number of channels is determined to maintain the minimum GOS.

A grade of service calculation based on an ErlangB formula is provided in Equation (1) as:

$$GOS = E(A, N) = \frac{A^N / N!}{\sum_{i=0}^{N} A^i / i!} \qquad \text{Equation(1)}$$

where A represents the offered traffic in Erlangs and N is the number of allocated radio channels. The parameter GOS represents the blocking probability and is typically engineered at 1% or 2%. This formula can be numerically solved when the desired GOS and A are known and N is desired. The function which solves for N for the desired GOS will be referenced from this point forward as ErlangB(A,GOS).

In a static radio resource scheme, radio channels are allocated to cells based on individual busy hour data. The static radio resources computation is given in Equation (2). Note that the peak offered traffic at cell i during the day is used to engineer the radio channel requirements, using Equation (2)

$$N_s = \sum_{i=1}^{N} ErlangB[\text{Max}_t(A_{i,t}), GOS] \quad \text{Equation(2)}$$

where Ns represents the number of radio traffic channels required for static allocation and $A_{i,t}$ represents offered traffic at cell i at time t. The $\text{Max}_t(A_{i,t})$ function is used to find the peak traffic for each cell during the relevant time period.

Equation (3) shows the radio requirements for dynamic radio resource method where radio resources are allocated on a per loading interval basis, $$N_d = \sum_{i=1}^{N} ErlangB[A_{i,t}, GOS] \quad \text{Equation(3)}$$

where $N_d$ represents the number of radio traffic channels required for cell i at time t. In the particular application of Equation (3) according to step 108, time t corresponds to the selected loading interval. In a particular application of the method of the present invention, each channel is a 200 kHz TDMA radio channel having eight time slots. Of the eight time slots, one time slot is reserved for signaling and seven time slots are available for traffic. Thus, each of the channels may service a full load level that is incorporated into Equation (3).

From step 108, operation proceeds to step 110 wherein channels are assigned to the cells/sectors of the wireless communication system based upon channel requirements and potential local interference among the cells/sectors for the assignment. In performing the initial assignments, potential interference within the communication system must be determined. Such initial determination is made based upon the interference produced by power sources within the system. In making the initial determination, the geographic locations of the different power sources are identified and modeled.

The power source model does not assume a uniform spacing for cells but instead uses actual cell position data. All mature networks will have non-homogeneous deployed cells and frequencies which reflect the non-uniformity in the network demand. These networks cannot be modeled using homogenous clusters.

Figure 2:
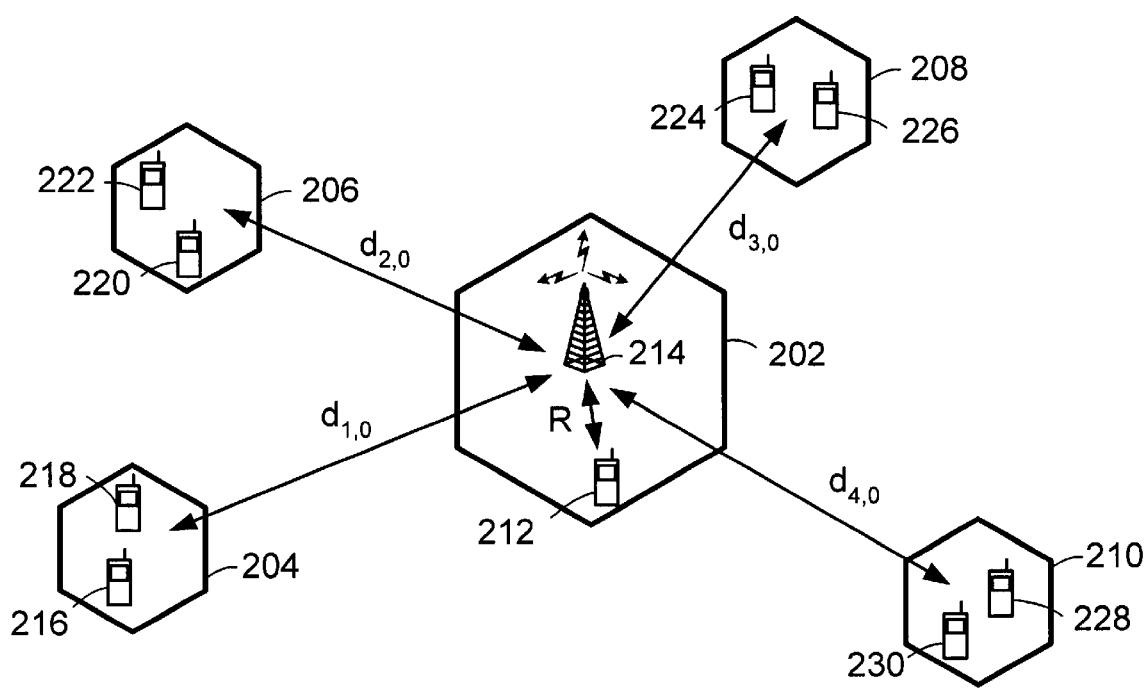
FIG. 2 is a diagram illustrating a portion of a wireless communication system illustrating the manner in which mobile units operating within other cells generate interference within a subject cell.

FIG. 2 illustrates a system within which the method of the present invention operates and in which cells/sectors have been deployed in a non-homogeneous manner. The system includes a subject cell 202 and surrounding cells 204,206, 208 and 210. A subject mobile unit (or mobile station "MS") 212 operates in the subject cell 202 while interfering MSs 216, 218, 220, 222, 224, 226, 228 and 230 operate in the surrounding cells. The subject MS 212 is in communication with base station 214 which includes a tower, an antenna and supporting hardware. A distance R represents the distance between the base station and the subject MS 212. Distances $d_{1,0}$, $d_{2,0}$, $d_{3,0}$ and $d_{4,0}$ represent the distance from the interfering MSs located in the surrounding cells 204, 206, 208 and 210, respectively, to the base station 214.

Cellular radio path loss models are typically based on real measurements which have been fitted to predict path loss under different parameters which typically include environment, transmission frequency, and antenna height. A maximum cell radius may be determined for a particular cell under a given set of conditions. The Cost231 model, which is derived from the Data Path Loss Model is used to predict path loss. Both urban and suburban models may be used, depending upon the characteristics of the subject system.

In defining radio path loss models according to the present invention, the following parameters are defined:

$\alpha_{i,j} = f(F_x, h_i, h_j, \text{Morph}_{ij})$  Equation (4)

$\beta_{i,j} = f(F_x, h_i, hT, \text{Morph}_{ij})$  Equation (5)

$\text{Path\_Loss}_{i,j} = \alpha_{i,j} * \log 10 \, (di,j) + \beta_{i,j}$  Equation (6)

$\text{Fade\_Margin}_{i,j} = f(\text{Morph}_{i,j}, GOScov, \text{LossMaterial})$  Equation (7)

$\text{Total\_Loss}_{i,j} = \text{Path\_Loss}_{i,j} + \text{Fade\_Margin}_{i,j} - \text{GANT\_SYSTEM}_{i,j}-$  Equation (8)

$P_j \geq P_{Rec-Sens}$  Equation (9)

$P_j = P_i - \text{Total\_Loss}_{i,j}$  Equation (10)

$\text{Link\_Budget}_{i,j} = \text{Path\_Loss}_{i,j}$ when $P_j = \text{PMIN\_REC}$  Equation (11)

$\text{Link\_Budget}_{i,j} = P_i - \text{Fade\_Margin}_{i,j} - \text{PMIN\_REC}$  Equation (12)

$\text{Link\_Budget}_{i,j} = \alpha_{i,j} * \log 10(d_{i,j}) + \beta_{i,j}$  Equation (13)

$d_{i,j} = 10 \exp\{(\text{Link\_Budget}_{i,j} - \beta_{i,j})/\alpha_{i,j})\}$  Equation (14)

$\text{RMAX} = d_{0,Ms} = d_{i,j}$  Equation (15)

Figure 3:
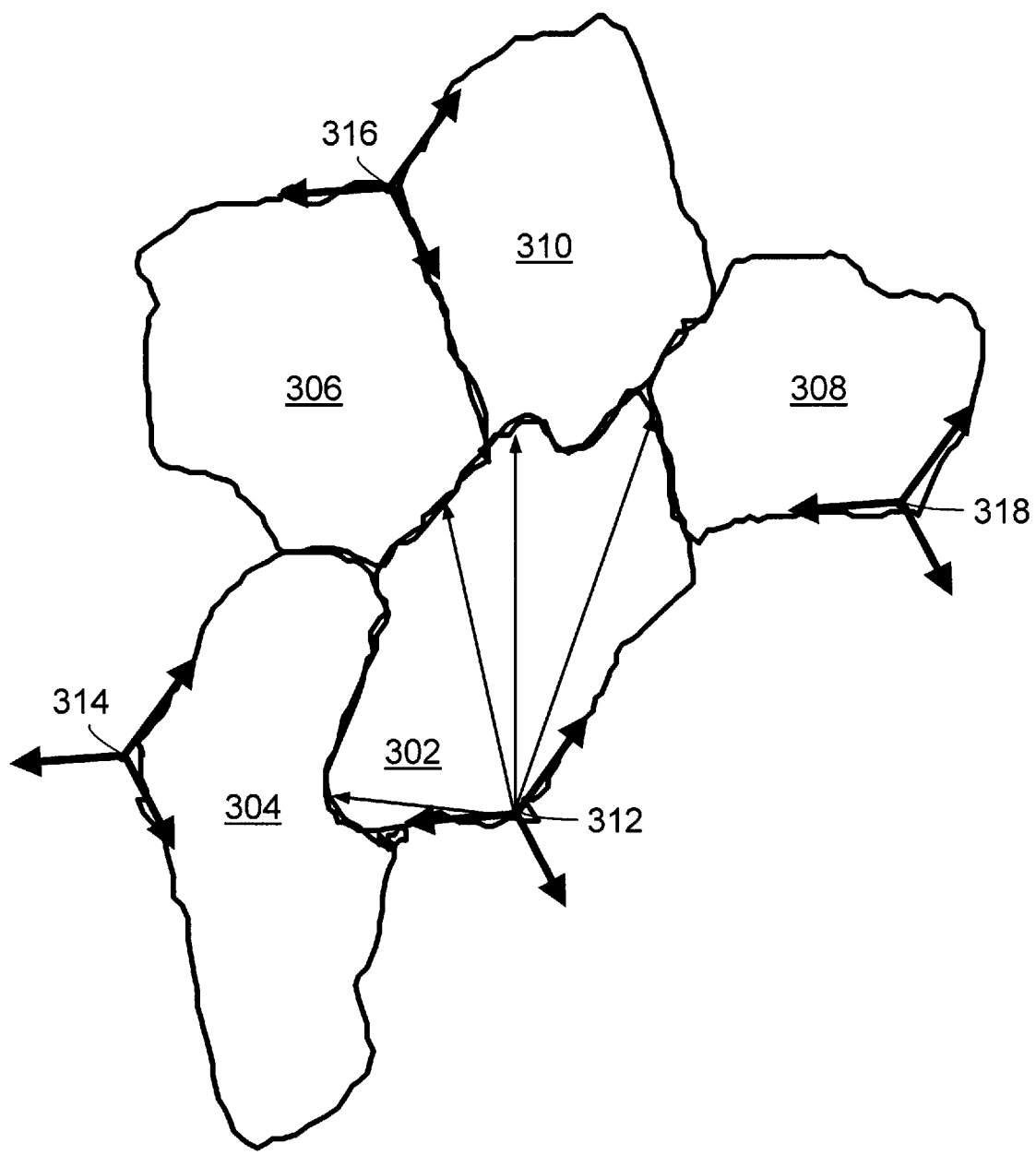
FIG. 3 is a diagram illustrating the manner in which cell/sector radius is determined according to the present invention.

$\text{RMAX} = 10 \exp\{(P_i - \text{Fade\_Margin}_{i,j} - \text{PMIN\_REC}_j - \beta_{i,j})/\alpha_{i,j})\}$  Equation (16)

where $\alpha_{i,j}$=Path Loss Slope from Point i to Point j
$\beta_{i,j}$=Path Loss Intercept from Point i to Point j
$\text{Path\_Loss}_{i,j}$=Path Loss from Point i to Point j
$F_i$=One of BTS$_i$ Frequencies
$h_i$=Effective Transmitter Height
$h_j$=Effective Receiver Height
$P_i$=Transmission Power at Point i
$P_j$=Receive Power at Point j
PMIN\_REC$_j$=Effective Minimum Receiver Power at Point j
Morph$_{i,j}$=Terrain Morphology from Point i to Point j
GOS$_{COV}$=Coverage Grade of Service FIG. 3 illustrates how the maximum cell radius, R, is determined for use with the method of the present invention. R is defined as the maximum distance from a base station tower serving a particular cell/sector to the boundary of the cell. As shown in FIG. 3, base station 312 serves sector 302, base station 314 serves sector 304, base station 316 serves sectors 306 and 310 and base station 318 serves sector 308. Directional antennas mounted upon towers of the base stations provide the coverage patterns illustrated for the base stations.

Sectors 302, 304, 306, 308 and 310 have non-uniform shapes, such non-uniform shapes assuming that radius R varies about the respective base station towers. For example, consider the non-uniform radius R of sector 302 which is served by base station 312. Proper system operation requires that the signal level for both uplink and downlink be above the minimum receiving criteria at any location within the sector 302. Thus for a location within the service area being at a greatest distance from the base station tower, a corresponding radius R is defined. Once the radius R is defined, a prediction for the worst case power of the carrier signal can be estimated for the served sector. This worst case carrier signal will be used to guarantee a minimum grade of service.

The distance matrix D shown in Equation (17) is computed and stored in a matrix to reduce duplicate computations, $$D = \begin{bmatrix} R_1 & d_{1,2} & \cdots & d_{1,n} \\ d_{2,1} & R_2 & \cdots & \cdots \\ \cdots & \cdots & \cdots & \cdots \\ d_{n,1} & \cdots & \cdots & R_n \end{bmatrix} \quad \text{Equation (17)}$$

where $R_i$ is the cell/sector radius for base station i and $d_{i,j}$ is the average distance between interfering MSs in cell i and the receive cell antenna in cell j. The non-diagonal elements in the D matrix represents the average physical distance between receive antenna and the interfering mobile stations. The diagonal terms represent distance to communicating mobile units on the edge of the cell.

As illustrated, typical suburban and urban cell sites are deployed in a tri-sector configuration which focuses more radio resources on smaller areas for traffic limited cases. In coverage limited cases, the tri-sector configuration can also be used to extend the site footprint. Since a sectorized antenna pattern significantly reduces gain in the non-pointing directions, it is extremely important to take the antenna orientation into account when computing the channel interference from other cells.

Figure 4:
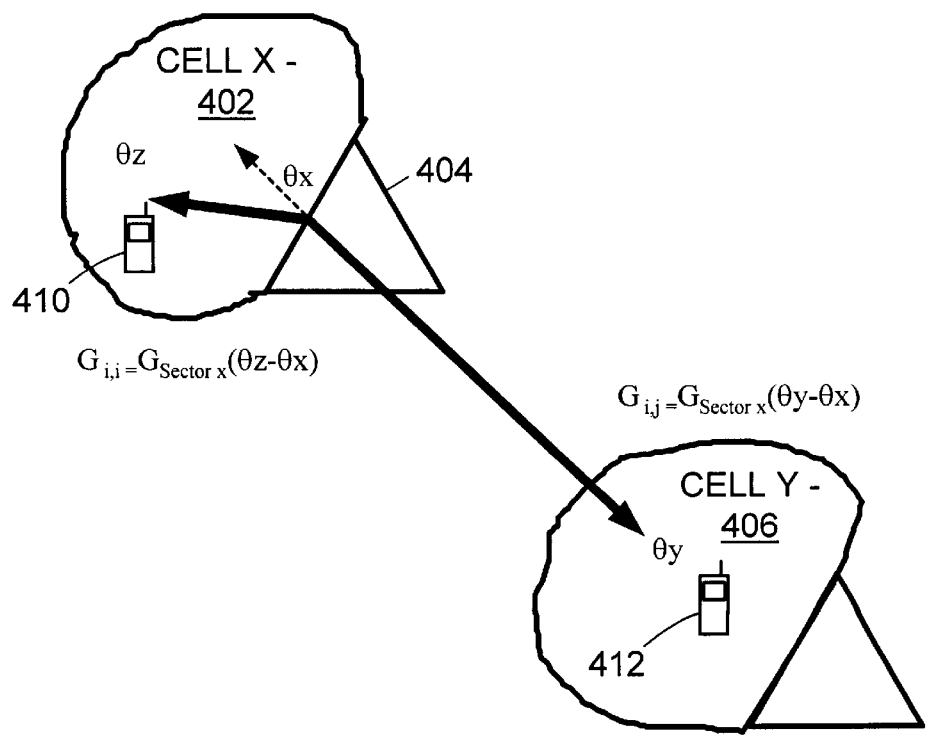
FIG. 4 is a diagram illustrating two cells/sectors of a wireless communication system and the manner in which antenna gain is analyzed according to the present invention to determine interference.

FIG. 4 illustrates the orientation of an interfering MS 412 signal operating in sector y 406 in relation to the receiving sector x 402. This angle is represented by $\Theta_y - \Theta_x$. The angle between the transmitting MS 410 in sector x and the receive cell tower antenna 404 is represented by $\Theta_z - \Theta_x$. The antenna system gain for each MS is computed based on the relative angle from the receiving sector antenna mapped into $G_{SectorX}(\cdot)$. The system gain calculation is shown in Equation (18).

$$G_{i,j} = Gx(\Theta y - \Theta x) \quad \text{Equation (18)}$$

$$G_{i,i} = Gx(\Theta z - \Theta x)$$

where $G_{i,j}$ is antenna system gain experienced by the interfering signal and $G_{i,i}$ is the antenna system gain experienced by the desired signal from the MS 410 in sector x 402.

The voice quality of a cellular wireless communication system is directly related to signal quality or Signal to Noise Ratio (SNR). The dominating signal impairment source in a cellular network is interference which includes the mobile units operating in the cell/sector and the potential interfering mobile units in the vicinity but resident in other cells/sectors. The carrier signal strength ($c_i$) can be computed as the mobile transmission power plus the antenna system gain minus the propagation loss.

$$c_i = P_{i,i} + G_{i,i} - \alpha_{i,i} * \log_{10}(R_i) + \beta_{i,i} \text{ dB} \quad \text{Equation (19)}$$

Since many wireless networks actively control the power level of the transmitting MS, it is reasonable to model the MS power at the receiver to be fairly constant. This eliminates the difficulty in estimating the MS transmit location. The minimum received signal strength at each cell receiver is assumed to be in the range of −93 to −97 dBm.

The interference power level is calculated as the average interference power level added to antenna system gain minus the path loss from average distance between the interfering MS position and the receive antenna.

$$i_{i,j} = P_{i,j} + G_{i,j} - \alpha_{i,j} * \log_{10}(d_{i,j}) + \beta_{i,i} \text{ dB} \quad \text{Equation (20)}$$

The above carrier signals and interference signals are used in the construction of the potential power level matrix shown in Equation (20). This power level matrix P is represented as, $$P = \begin{bmatrix} c_1 & i_{1,2} & \cdots & i_{1,max\_cell} \\ i_{2,1} & c_2 & \cdots & \cdots \\ \cdots & \cdots & \cdots & \cdots \\ i_{max\_cell,1} & \cdots & \cdots & c_{max\_cell} \end{bmatrix} \quad \text{Equation (21)}$$

The power level matrix P of Equation 21 is introduced to eliminate re-computation of potential interferers. The diagonal elements contain the power level received from mobiles under constant transmit power control. The non-diagonal matrix elements represent the interference power levels. For example matrix element $i_{2,1}$ represents the interference power level from cell 2 to cell 1. Note that this matrix in general will be non-symmetric due to the difference in effective radiated power from each base station.

In order to add interference power levels, the power level matrix P is converted from logarithmic units back to linear units and stored in matrix p, $$p = 10^{P(dB)/10} \text{ or } p_{i,j} = 10^{P_{i,j}(dB)} \quad \text{Equation (22)}$$

Each potential interference $p_{i,j}$ is normalized by the corresponding competing carrier signal $c_j$ to form $n_{i,j}$. The matrix representation, $i/c_{potential}$, contains the normalized linear potential power levels for all potential competing signals, $$i/c_{potential} = \begin{bmatrix} 1 & n_{1,2} & \cdots & n_{1,n} \\ n_{2,1} & 1 & \cdots & \cdots \\ \cdots & \cdots & 1 & \cdots \\ n_{n,1} & \cdots & \cdots & 1 \end{bmatrix} \quad \text{Equation (23)}$$

A radio channel allocation matrix is used in computation of actual signal interference. Equation (24) shows the radio channel allocation matrix F, $$F = \begin{bmatrix} f_{1,1} & f_{1,2} & \cdots & f_{1,nmax} \\ f_{2,1} & f_{2,2} & \cdots & \cdots \\ \cdots & \cdots & \cdots & \cdots \\ f_{kmax,1} & \cdots & \cdots & f_{kmax,nmax} \end{bmatrix} \quad \text{Equation (24)}$$

where index, k max, is the maximum radio channel number and index, n max, is maximum cell number. The F matrix represents the frequency allocation scheme. Each column in the matrix describes the frequencies which are allocated for each cell/sector. An entry in the matrix will be either zero if the frequency is not allocated or one if the frequency is allocated.

The i/c matrix, i/c, is computed by multiplying the radio channel allocation matrix by the potential interference matrix, $$i/c = F * i/c_{potential}$$

$$i/c = \begin{bmatrix} i/c_{1,1} & \cdots & \cdots & i/c_{1,k\,max} \\ \cdots & \cdots & \cdots & \cdots \\ i/c_{n\,max,1} & \cdots & \cdots & i/c_{n\,max,k\,max} \end{bmatrix} \quad \text{Equation (25)}$$

The i/c matrix contains the actual interference levels existing in the network based on the given allocated frequencies. The matrix has k columns, one for each radio frequency, and j rows, one for each cell/sector in the network.

Referring again to FIG. 1, at step 110 channels are initially assigned based upon the channel requirements determined at step 108 and the potential interference from neighboring cells/sectors. In such channel assignment, adjacent cells/ sectors are considered in the allocation. However, overall system interference is not.

From step 110, operation proceeds to step 112 wherein the assigned channels are reassigned based upon actual interference in the system to minimize overall system interference. The dynamic frequency allocation method of the present invention uses both deployment information along with traffic measurements to maximize network voice quality. Under the criteria of step 112, channel reassignments are made in an attempt to maximize the voice quality in a cellular network by maximizing the C/I under limited system bandwidth. The objective function maximizes C/I by minimizing the average I/C ratio per Erlang in the network according to Equation (26), $$i/c_{System} = \frac{\sum_i \sum_k A_{i,k} * i/c_{i,k}}{\sum_i \sum_k A_{i,k}} \quad \text{Equation (26)}$$

where $A_{i,k}$ is the offered traffic generated on frequency k in cell i. The objective of step 112 has the following constraint associated with each element in the i/c matrix:

$$i/c_{i,k} < \frac{1}{c/i_{min}} \text{ for } \forall \text{ Cell} \quad \text{Equation (27)}$$

This constraint is imposed to guarantee a minimum grade of service, typically quantified by a bit error rate (BER) <0.001.

A channel exclusion constraint may be used in steps 110 and 112 to minimize adjacent channel interference. This constraint prevents the assignment of an adjacent channel within a base station (or alternately prevents the assignment of adjacent channels to adjacent base stations). For example if channel 5 is assigned to a base station then channel 4 and channel 6 will be excluded from site assignment to other sectors of the base station. Equation (28) shows an exclusion matrix for a two site system with seven radio channels. Each column is a sector index and each row is a frequency index. Columns 1–3 refer to sectors of base station 1 and columns 4–6 refer to sectors of base station 2. For example, the 1 entered at $E_{1,1}$ indicates radio channel 1 is assigned to sector 1 of base station 1, and the 3 x's entered in $E_{2,1}$, $E_{2,2}$, $E_{2,3}$, indicate radio frequency 2 is excluded from use in all sectors of base station 2.

$$E = \begin{bmatrix} 1 & x & x & x & x & x \\ x & x & x & 1 & x & x \\ x & 1 & x & x & x & x \\ x & x & x & x & 1 & x \\ x & x & 1 & x & x & x \\ x & x & x & x & x & 1 \\ x & x & x & x & x & x \end{bmatrix} \quad \text{Equation (28)}$$

Once step 112 is accomplished for the select loading interval, operation proceeds to step 114 where it is determined whether the subject loading interval is the last loading interval of the subject loading interval sequence. If it is not, operation proceeds to step 104 wherein the next loading interval in the loading interval sequence, or a first loading interval in another loading interval sequence is selected.

However, if at step 114 it is determined that the subject loading interval is the last loading interval in the last loading interval sequence under consideration, operation proceeds to step 116. At step 116 the channel assignments for the loading intervals are allocated in the system for actual corresponding time periods. For example, if each loading interval corresponds to an hour segment of a twenty-four hour day steps 102–114 will be performed for each of the twenty-four loading intervals to determine respective channel assignments. Then, based upon the channel assignments, allocations will be made at each actual corresponding time period. Channel reallocations may be made using a known "Frequency Hop" command. As each subsequent time period is reached that corresponds to a loading interval, another reallocation is performed.

Figure 1B:
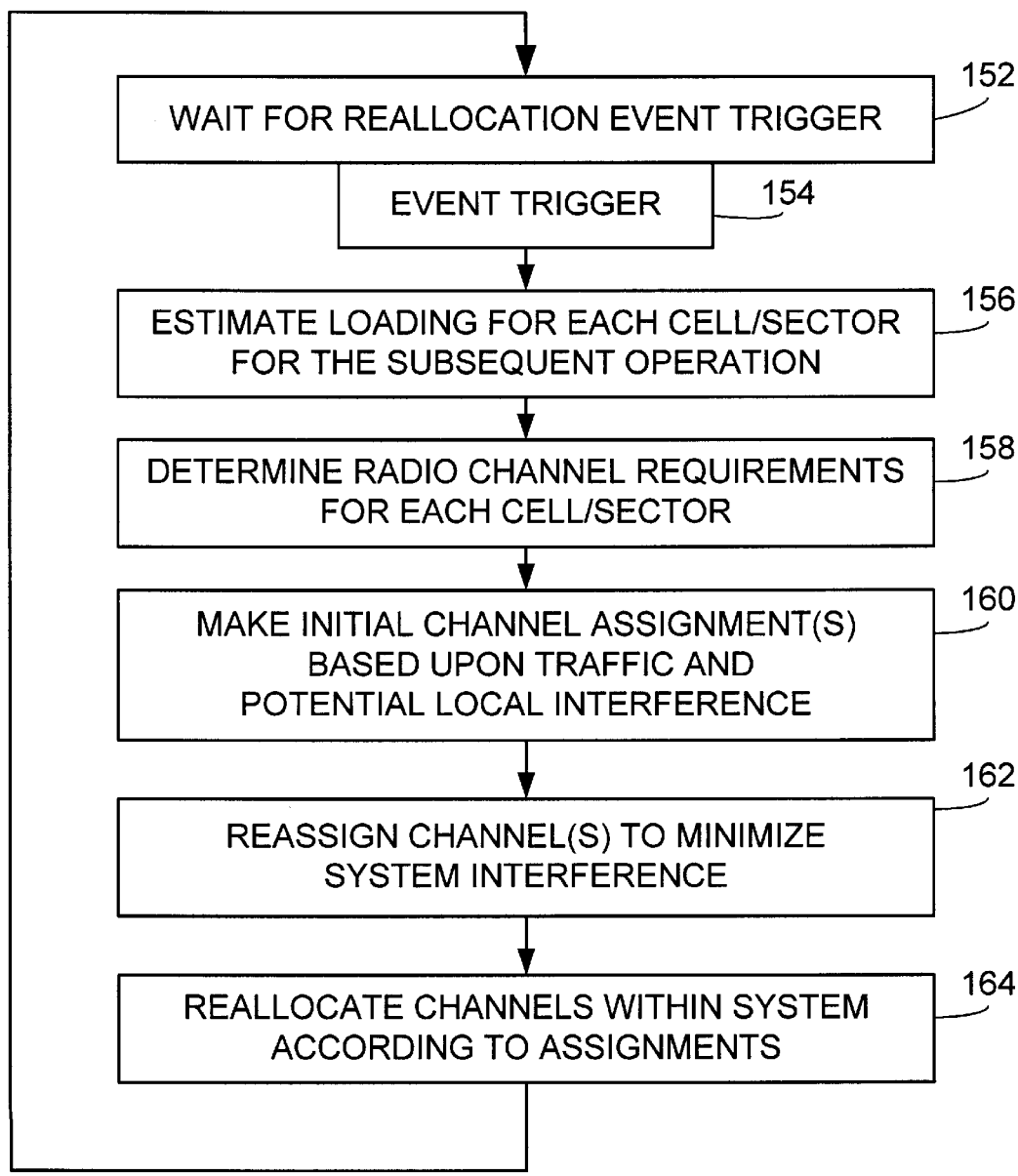
FIG. 1B is a logic diagram illustrating an alternative method for dynamically allocating radio resources according to the present invention.

FIG. 1B illustrates an alternative method for dynamically allocating radio resources according to the present invention. As compared to the operation described with reference to FIG. 1A, the operation described with reference to FIG. 1B performs reassignment and reallocation as required, as opposed to performing on a loading interval basis. Thus, operation according to FIG. 1B only performs reassignment and reallocation when it is deemed to be needed.

Operation commences at step 152 and remains until a reallocation event trigger is met. When system performance is satisfactory with a current allocation of channels, the channel allocation is retained. However, when it is determined that the current allocation should be altered, an event trigger will be received at step 154. Event triggers be caused when loading in any given cell exceeds a loading limit, when the number of dropped calls exceeds a limit or when such other operation(s) occur as to warrant a reallocation of channels. An event trigger may also be time based, such that an event trigger is generated at a particular time.

Next, at step 156, loading for subsequent operations are determined. Step 156 allows all previous historical loading to be used in estimating the loading for subsequent operation. Then, at step 158, radio channel requirements are determined for each cell/sector in the system based upon loading requirements. Once the loading requirements have been determined, operation proceeds to step 160 wherein an initial assignment of channels is made based upon traffic and potential local interference. Then, at step 162, the channels are reassigned to minimize system interference. Once the reassignment is complete, the channels within the system are allocated at step 164 according to the assignments determined at step 162. Thus, the operations made at steps 156, 158, 160, 162 and 164 are analogous to those described in steps 106, 108, 110, 112 and 116, respectively.

Figure 5:
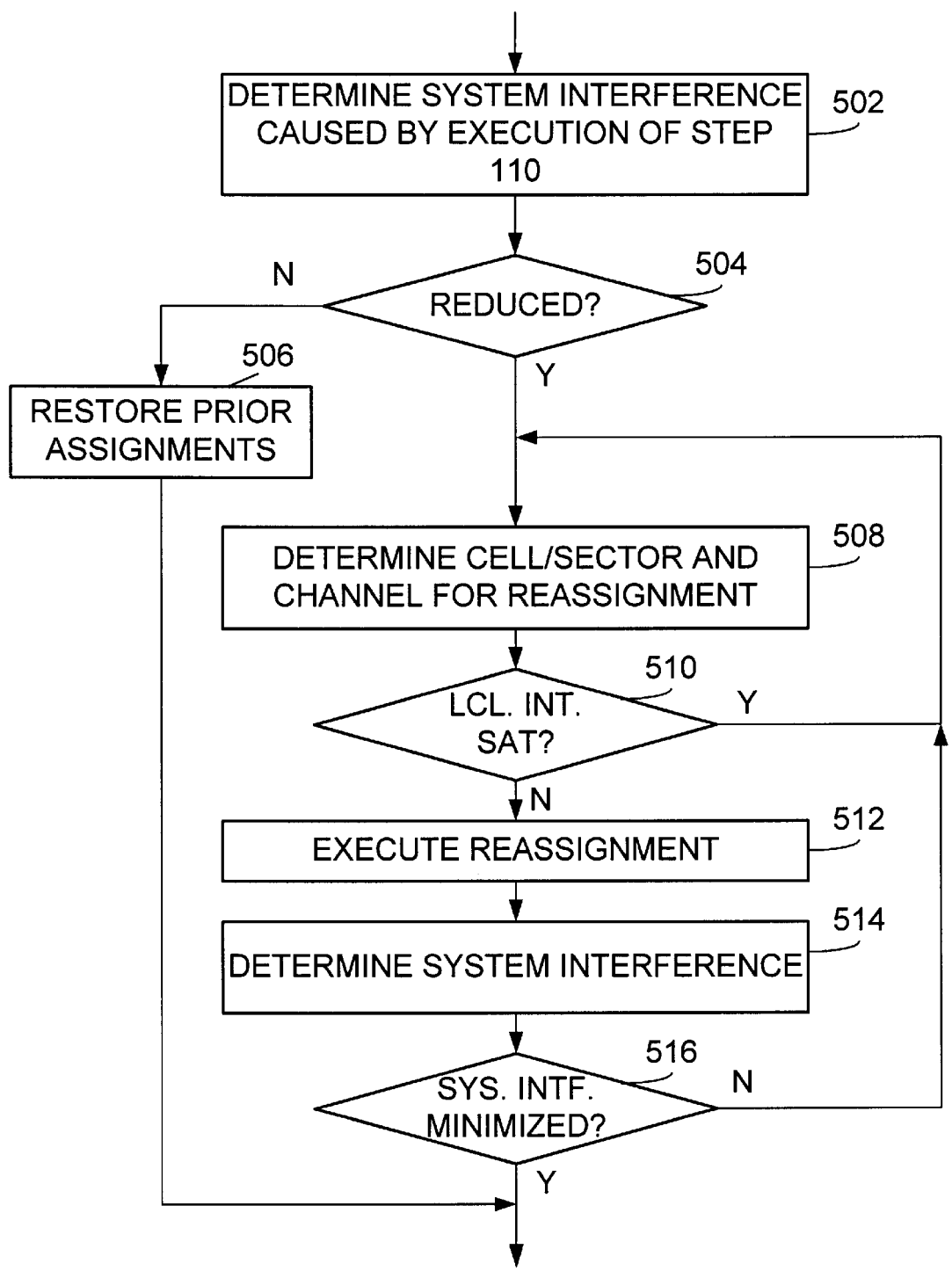
FIG. 5 is a logic diagram illustrating a method for dynamically reallocating radio resources according to the present invention to minimize system interference.

FIG. 5 illustrates an embodiment of step 112 of FIG. 1A or step 162 of FIG. 1B that is employed in the dynamic reassignment of channels. Operation commences at step 502 wherein it is first determined whether operation of step 110 (or step 160) had a system interference reducing effect as determined by Equations (26) and (27). A base-line for such determination is the prior loading interval channel assignment or the current channel assignment, as the case may be. If the system interference was not reduced by operation of step 110 (or step 160), the prior channel assignment is restored or retained at step 506 and operation returns. However, if operation at step 110 (or step 160) did reduce system interference, operation proceeds to step 508.

At step 508, a particular cell/sector channel reassignment is determined. Such determination is based upon the cell/sector having the worst interference performance. Prior to executing the cell/sector channel assignment, it is first determined at step 510 whether the reassignment increases localized interference so that it exceeds the maximum allowable level. If so, operation returns to step 508. However, if the channel reassignment did increase localized interference above the maximum allowable level, the channel reassignment is executed at step 512. Then, at step 514, the total system interference is determined. If the system interference level is minimized at step 516, operation continues. However, if the total system interference at is not minimized, operation returns to step 508.

Figure 6:
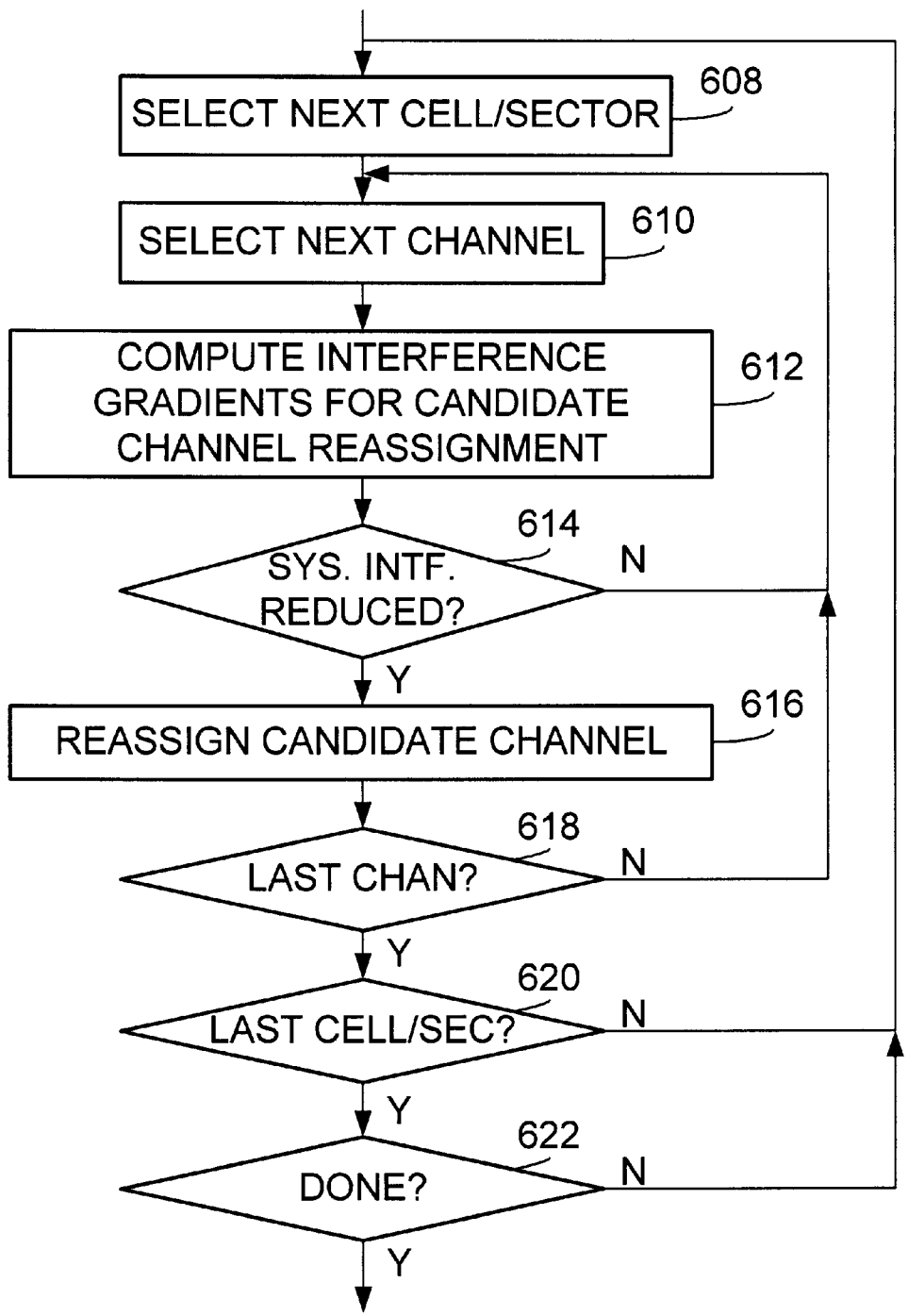
FIG. 6 is a logic diagram illustrating another method for dynamically reallocating radio resources according to the present invention in which a gradient descent algorithm is employed in determining radio resources to be reallocated.

FIG. 6 illustrates an embodiment of step 112 of FIG. 1A or step 162 of FIG. 1B in which a gradient descent algorithm is employed to perform channel reassignments. Operation commences at step 608 where a next cell/sector under consideration for channel reassignment is selected. During a first execution of step 608, of course, the first cell/sector under consideration is selected. Then, at step 610, a next channel under consideration for reassignment corresponding to the cell/sector is selected. At step 612, interference gradients are determined for the cell/sector and channel under consideration for reassignment. The parameter $Ipot_{j,Q}$ is defined as the normalized potential interference experienced by sector j in channel Q if a sector under consideration is assigned channel Q according to Equation (29)

$$Ipot_{j,Q} = Ic_{j,Q} + I_{j,x,Q} \qquad \text{Equation (29)}$$

During execution of step 612, Equation (29) is subject to the constraint, $Ipot_{j,Q} \leq I_{MAX,x,Q}$, for all potential co-channel interferers. The index j represents the array of all Q co-channel cells. The term, $Ic_{j,Q}$, is the total interference before the addition of interference from sector X. The term, $I_{j,x,Q}$, is the incremental interference due to the assignment of channel Q in sector X. Similarly, the reduction in interference is computed by indexing through the k sector group.

$$Ipot_{j,R} = Ic_{j,r} + I_{j,x,R} \qquad \text{Equation (30)}$$

If all constraints are satisfied, the relative benefit of the channel reassignment is determined in Equation (31) using a derivative of the average i/c metric, $$i/c_{System} = \qquad \text{Equation (31)}$$
$$\frac{(Ipot_{X,Q} - Ic_{X,Q})EX}{Rx} + \left( \sum_j \frac{I_{j,x}E_j}{R_j} - \sum_k \frac{I_{k,x}E_k}{R_k} \right) < 0$$

where Ej is the Erlangs experienced for a specific interval period for sector j, and Rk is the number of radio channels required for a particular time interval.

The reassignment that is most beneficial is determined at step 612 and then, at step 614, it is determined whether the channel reassignment will reduce system interference and whether the reassignment is consistent with local interference constraints. If both of these constraints are satisfied, operation proceeds to step 616 where the reassignment is executed. If not, operation proceeds to step 610.

From step 616, operation proceeds to step 618 where it is determined whether all channels for the cell/sector under consideration have been considered for reassignment. If so, operation proceeds to step 620. If not, operation proceeds to step 610. If the current cell/sector under consideration is the last, operation proceeds to step 622. If not, operation proceeds from step 620 to step 622 where it is determined whether operation is complete. Operation completes when a complete pass of all cells/sectors in the system yields no further radio channel reassignments.

Figure 7:
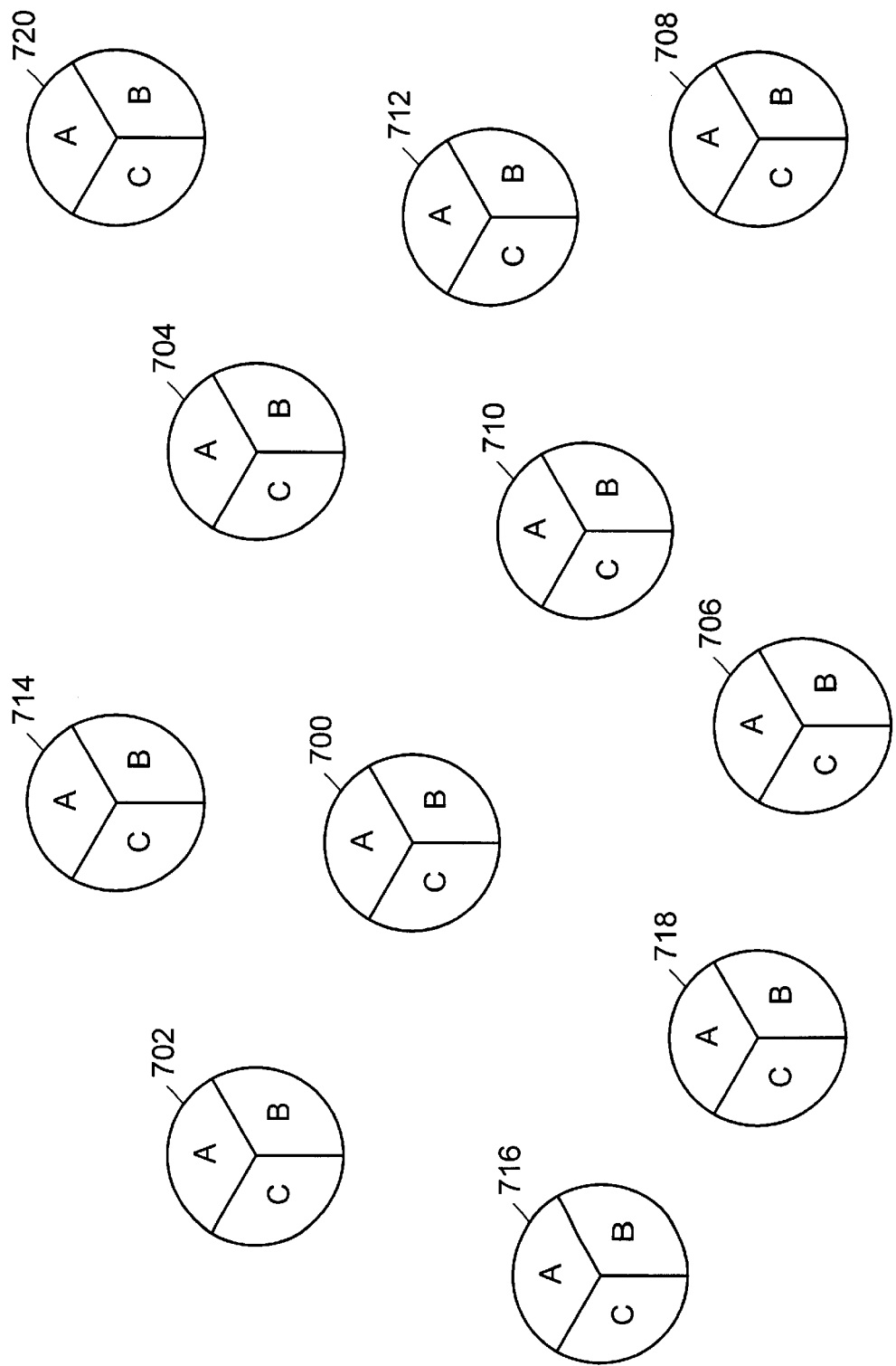
FIG. 7 is a diagram illustrating a portion of a cellular communication system in which radio resources are considered for reallocation.

FIG. 7 illustrates a plurality of cells/sectors 700 through 720 of a system upon which the method of FIG. 6 operates in reallocating radio resources. In the example, the gradient descent algorithm is employed to perform channel reassignments considering both localized and system interference. In a particular operation of step 112, sector C of cell 700 is a candidate for a channel reassignment from channel R to channel Q. Should such a reassignment be performed, interference in sector C of cell 716, sector A of cell 714, sector A of cell 712 and sector B of cell 710 will potentially be reduced. However, the reassignment would increase the interference in sector A of cell 702, sector B of cell 704, sector B of cell 708 and sector B of cell 706.

Thus, for the potential channel reassignment, the potential system interference decrease or increase is first determined before the reassignment is made. Using the gradient descent algorithm, the potential interference increases and decreases are considered to determine channel reassignments that will most greatly reduce system interference. Then, based upon the determination of the gradient descent algorithm, the reallocation may be made.

Figure 8:
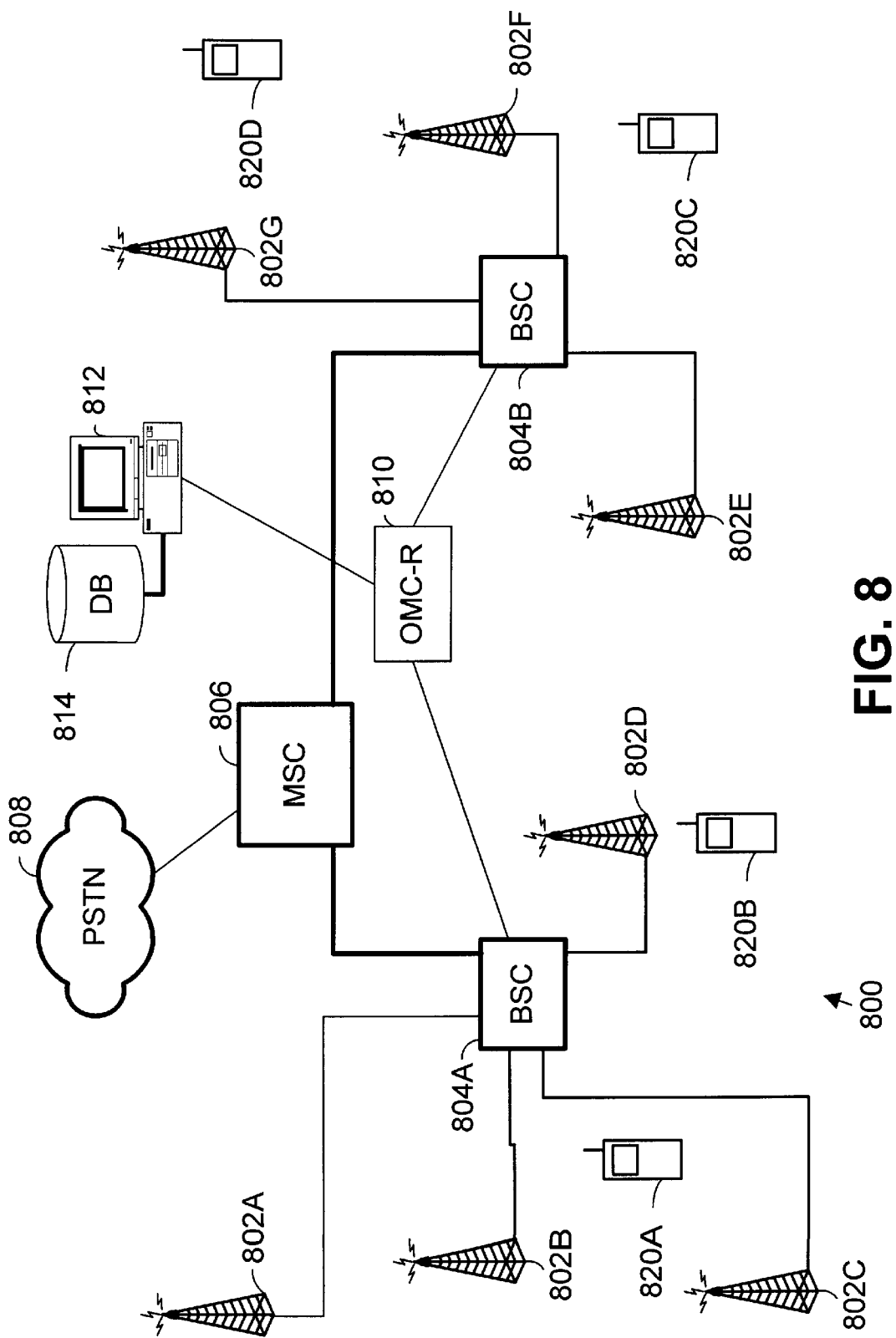
FIG. 8 is a system diagram illustrating a wireless communication system within which the dynamic radio resource allocation according to the present invention is implemented.

FIG. 8 illustrates a wireless communication system 800 constructed according to the present invention that performs dynamic radio resource allocation according to the present invention. The wireless communication system 800 includes a plurality of base stations 802A–802G dispersed within an area served by the system 800. Base station controllers (BSCs) 804A and 804B couple the base stations 802A–802G to a mobile switching center (MSC) 806. The MSC 806 couples to the Public Switched Telephone Network (PSTN) 808 and routes traffic from mobile units 820A–820D to other mobile units and to wired units coupled to the PSTN 808. The wireless communication system 800 includes an Operational Maintenance Control Radio unit (OMC-R) 810 that couples a computer 812 to the BSCs 804A and 804B. The computer 812 couples to a database 814 that, together with the computer 812 execute dynamic radio resource allocation. Together, the computer 812 and database are referred to as an intelligent radio advisory system. The computer 812 is programmed to operate in conjunction with the BSCs 804A and 804B to implement the allocations previously determined. Implementing static radio resource allocations is generally known in the art and will not be further described herein. To implement the dynamic radio resource allocations according to the present invention, an ongoing sequence of allocations is performed according to the loading intervals selected.

According to the present invention, the base stations 802A–802G, BSCs 804A and 804B, the MSC 806, the OMC-R 810 and the computer 812 include at least some digital circuitry capable of executing software instructions. These devices also include some form of memory, e.g. RAM, SRAM, ROM, disk drive, etc., that is capable of storing software instructions that may be accessed and executed. Instructions stored in the memory of these devices, when executed by the various components of the system 800, cause the system 800 to dynamically allocate radio resources to reduce interference in the system 800. Construction of the base stations 802A–802G, BSCs 804A and 804B, the MSC 806, the OMC-R 810 and the computer 812 are generally known in the art and will not be further described herein.

Figure 9:
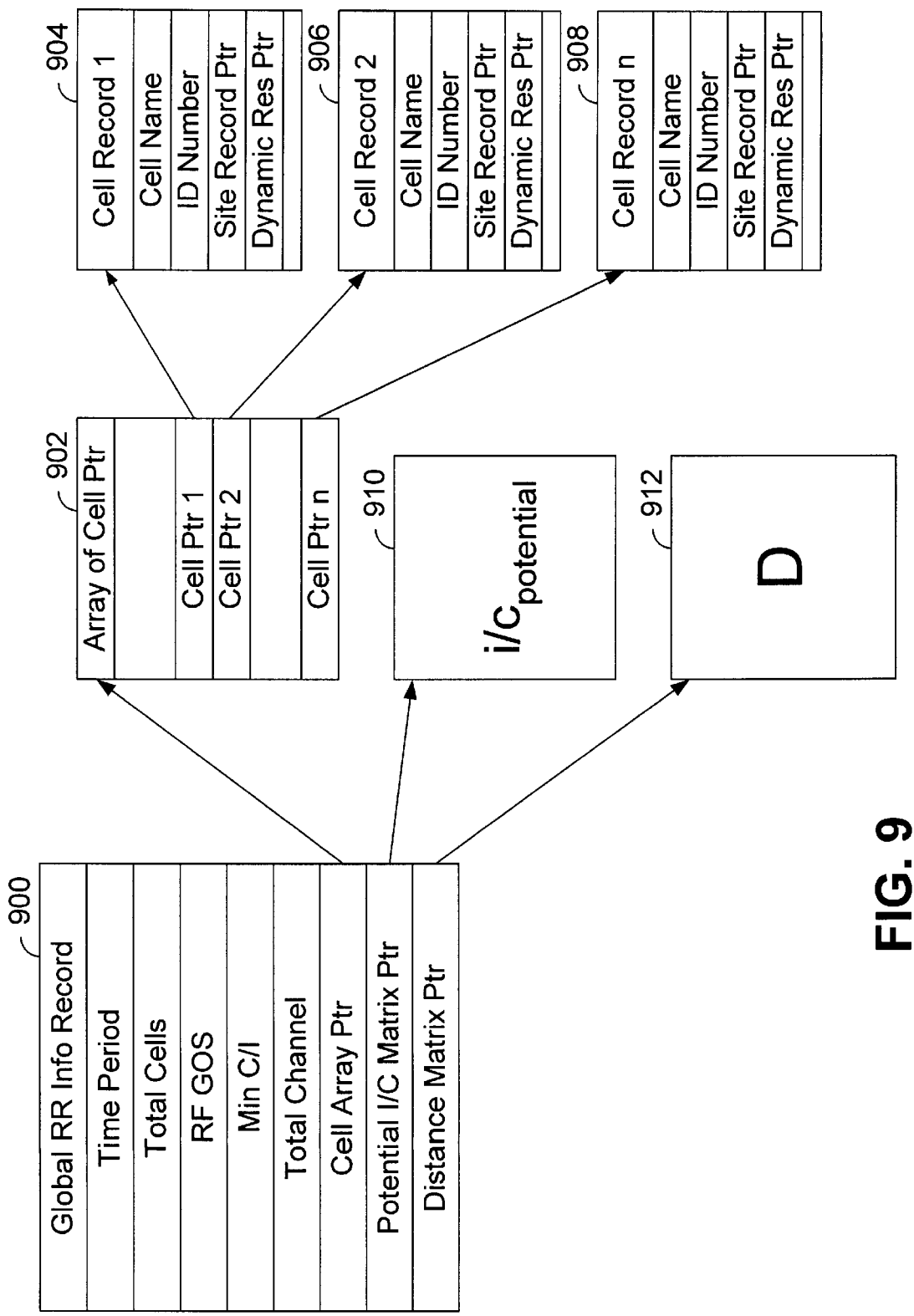
FIG. 9 is a block diagram illustrating data structures used in the operation of the present invention.

FIG. 9 illustrates data structures employed in a particular implementation of operation according to the present invention. Data structures typically have a significant impact on the performance of the algorithms. Therefore, that data structures chosen will have an important affect on operation according to the present invention. In the described data structures, pointers are used extensively so that searches are minimized while a centralized depository is maintained.

The Global RR Info Record 900 contains parameters which controls the overall operation of the method and store critical links to all radio resource data. The Time Period variable contains the current operational time interval. The Total Cell variable stores the total number of cells in the system so the system can dynamically allocate the exact amount of memory need for different matrices. The RF GoS matrix contains the desired Grade of Service for the Radio Network. This term will be used to compute radio resource requirements for each period. The Min C/I variable is used to limit the minimum C/I for all radio channels within the system. If minimum C/I level are not met for a cell then the required number of channels will not be allocated. This will reduce the GoS for that service area.

The Total Channel variable indicates total number of radio channels that are available for a particular radio system. The CellArray Ptr points to the first entry in the Array of Cell Pointers 902. Each Cell Ptr of the Array of Cell Pointers 902 points to an individual Cell Record, e.g. Cell Record 1 904, Cell Record 2 906 and Cell Record n 908. Each Cell Record contains information about a respective cell, including the cell name, a network ID number and pointers that point to data structures that contain radio resources connectivity information, position information, site attributes and dynamic radio resource management information. These pointers include the Site Record Ptr and the Dynamic Res Ptr. A Potential I/C Matrix Ptr and the Distance Matrix Ptr of the Global RR Info Record 900 points to the i/c potential matrix 910 and the distance Matrix, respectively.

Figure 10:
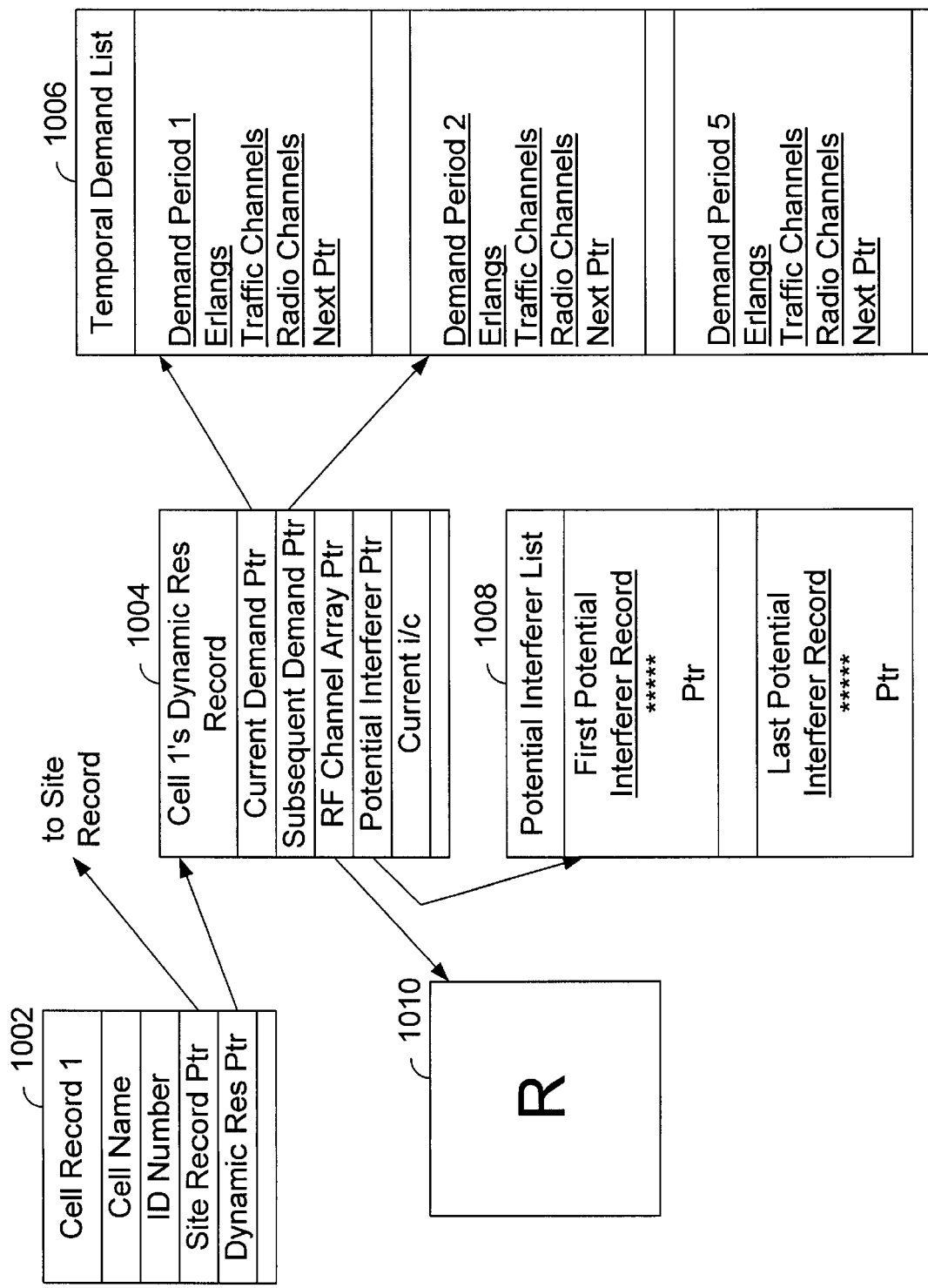
FIG. 10 is a block diagram illustrating additional data structures used in the operation of the present invention.

FIG. 10 illustrates additional data structures used in coordination with a method according to the present invention. Cell Record 1 1002 includes the Site Record Ptr which points to a Site Record for the cell. The Dynamic Res Ptr variable points to a data structure required to make channel assignment decisions. Cell 1's Dynamic Res Ptr points to Cell 1's Dynamic Res Record 1004 which contains or points to all information that is require to make radio resource allocation decisions for the particular cell. Critical traffic and channel requirements contained in a Demand Period Record for each loading interval contained in a Temporal Demand List are pointed to by the Current Demand Ptr of the Dynamic Res Record 1004. The Demand Period Record contains the offered Erlangs, the Traffic Channel and logical Radio Channels required for a particular loading interval. A linked listed structure is used to store the demand information for all intervals.

The RF Channel Array Ptr is used to point to cell radius values 1010 (contained in a Radius Matrix) so that the effective reuse computation can be performed. This computation is used to compare DCA performance to conventional FCA approaches and is not required for the DCA implementation. A Potential Interferer Ptr points to the first Potential Interferer Record in a Potential Interferer List 1008. The Potential Interferer List 1008 is used to reduce the search space of potential interferers while maintaining a centralized interference matrix which can be easily updated.

Each Potential Interferer Record has several pointer which allow the DCA algorithms to access the most up to date interference information about the potential interferer. First the interferer Cell Ptr is used to document information about the position and name of the potential interferer. An i/c level to Ptr and an i/c level from Ptr contained in each Potential Interferer record point to the potential to and from interference levels from a cell if the same channel is assigned. A Dist Ptr contained in each Potential Interferer record points to distance records in the distance Matrix that are used in effective reuse computations.

In executing step 110 of FIG. 1A and step 160 of FIG. 1B, a linked listed of potential interferers for each cell in the data base is first created. With this linked list created, computation of actual interference requires only that a minimum number of cells considered. The inputs to these computations are distance matrix D a potential interference threshold, $I_T$, and cell database records which are extracted from the Cell Records, e.g. 904, 906 and 908. For each cell in the network, a linked listed of potential interferer records is created which consist of a set of pointers. Each entry, a cell_ptr entry, is used to point to a cell record associated with a potential interference source.

Pointers if_level_to_ptr and if_level_from_ptr are used to point to the value of the interference levels between potential interferers. These two way pointers are used to compute both the interference experienced by the cell and the interference created by the cell on other neighboring cells. A distance pointer points into the distance matrix D which has the distance between the cell and the potential interference cell. The distance value is used to compute effective reuse distance so that a perfornance can be bench marked against conventional frequency reuse algorithms.

Equations 32 and 33 are matrices used to illustrate the manner in which potential interference is created for a small, three cell network. Equation 32 provides the potential interference matrix $i/c_{potential}$ for the three cell network while Equation 33 provides the distance matrix D for the three cell network.

$$i/c_{potential} = \begin{bmatrix} 1 & 0.025 & 0.001 \\ 0.020 & 1 & 0.053 \\ 0.002 & 0.044 & 1 \end{bmatrix} \quad \text{Equation(32)}$$

$$D = \begin{bmatrix} 0 & 1.2 & 4.0 \\ 1.2 & 0 & 1.0 \\ 4.0 & 1.0 & 0 \end{bmatrix} \quad \text{Equation(33)}$$

In determining the potential interference for the three cell network when initially assigning channels, the threshold for potential interferers is set to 0.005. Therefore, if any potential interference level, either from or to the cell, exceeds this threshold, then that potential interferer will be added to the linked list. Determining the interference to other cells from cell 1 is found by scanning across row 1 of the potential interference matrix. Similarly, the interference from cell 1 to other cells is found by scanning down column 1 of the potential interference matrix. In this example, the interference levels from cell 1 to cell 2 is 0.025 and the interference from cell 2 to cell 1 is 0.020. Both exceed the threshold and therefore a potential interferer record is created for each.

The potential interferer pointer from the Cell Record for cell 1 is assigned to point to the Potential Interference Record 1. The if_level_to_ptr is assigned to point to the potential interference element in row 1, column 2. Similarly, the if_level_from_ptr is assigned to point to potential interference element in row 2, column 1. The cell_ptr is assigned to point to the address of the cell 2 record so information about the potential cell can be accessed. The distance pointer is assigned to point to the floating point value located in $D_{1,2}$. Since there are no more potential interferers, the next pointer is set to point to NULL. Potential interference linked lists are created in a similar fashion for cell 2 and cell 3.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of allocating radio channels within a wireless communication system having a plurality of intercoupled base stations, the method comprising:
   selecting a plurality of loading periods; and
   for each loading period:
     estimating a loading for each of the plurality of base stations;
     allocating a number of channels sufficient to satisfy the loading for each of the plurality of base stations; and
     assigning channels among the plurality of base stations to minimize radio interference within the wireless communication system by:

initially assigning channels among the plurality of base stations to minimize local radio interference; and reassigning the channels among the plurality of base stations to minimize system radio interference.

2. The method of claim 1, further comprising, for each loading period, operating the wireless communication system according to a determined channel assignment.

3. The method of claim 1, wherein system radio interference is determined according to the equation:

$$i/c_{System} = \frac{\sum_i \sum_k A_{i,k} * i/c_{i,k}}{\sum_i \sum_k A_{i,k}}$$

where $A_{i,k}$ is the offered traffic generated on frequency k in cell i and $i/c_{i,k}$ is the actual radio interference level existing in the wireless communication system on frequency k in cell i.

4. The method of claim 1, wherein a plurality of loading intervals forms a loading interval sequence.

5. The method of claim 4, wherein the loading interval sequence is repeated for weekdays.

6. The method of claim 4, wherein the loading interval sequence is repeated for weekend days.

7. The method of claim 1, wherein at least one of the base stations supports a plurality of sectors and the method includes:

assigning channels among the plurality of sectors of the at least one base station to minimize radio interference within the wireless communication system.

8. The method of claim 1, wherein, in estimating a loading for each of the plurality of base stations, historical loading patterns are employed.

9. The method of claim 1, wherein in assigning channels among the plurality of base stations to minimize radio interference within the wireless communication system, radio propagation and base station positions are employed.

10. A wireless communication system comprising:

a plurality of base stations interconnected to support wireless communications within a service area; and a radio resource allocation among the plurality of base stations, wherein the radio resource allocation varies over a plurality of loading periods and for each loading period:

a plurality of channels sufficient to satisfy the loading have been allocated for each of the plurality of base stations;

the plurality of channels have been assigned among the plurality of base stations to minimize radio interference within the wireless communication system;

the plurality of channels are initially assigned among the plurality of base stations to minimize local radio interference; and the plurality of channels are reassigned channels among the plurality of base stations to minimize system radio interference.

11. The wireless communication system of claim 10, wherein, for each loading period, the wireless communication system operates according to a determined channel assignment.

12. The wireless communication system of claim 10, wherein system radio interference is determined according to the equation:

$$i/c_{System} = \frac{\sum_i \sum_k A_{i,k} * i/c_{i,k}}{\sum_i \sum_k A_{i,k}}$$

where $A_{i,k}$ is the offered traffic generated on frequency k in cell i and $i/c_{i,k}$ is the actual radio interference level existing in the wireless communication system on frequency k in cell i.

13. The wireless communication system of claim 10, wherein a plurality of loading intervals forms a loading interval sequence.

14. The wireless communication system of claim 13, wherein the loading interval sequence is repeated for weekdays.

15. The wireless communication system of claim 13, wherein the loading interval sequence is repeated for weekend days.

16. The wireless communication system of claim 10, wherein at least one of the base stations supports a plurality of sectors and the wireless communication system includes:

assigning channels among the plurality of sectors of the at least one base station to minimize radio interference within the wireless communication system.

17. The wireless communication system of claim 10, wherein, in estimating a loading for each of the plurality of base stations, historical loading patterns are employed.

18. The wireless communication system of claim 10, wherein in assigning channels among the plurality of base stations to minimize radio interference within the wireless communication system, radio propagation and base station positions are employed.

19. A computer readable medium that is readable by at least one component of a wireless communication system that includes a plurality of interconnected base stations, the computer readable medium comprising:

a first set of instructions that, when executed by the wireless communication system, cause the wireless communication system to select a plurality of loading periods;

a second set of instructions that, when executed by the wireless communication system, cause the wireless communication system, for each of a plurality of loading periods, to estimate a loading for each of the plurality of base stations;

a third set of instructions that, when executed by the wireless communication system, cause the wireless communication system to allocate a number of channels sufficient to satisfy the loading for each of the plurality of base stations for each of the plurality of loading periods; and a fourth set of instructions that, when executed by the wireless communication system, cause the wireless communication system to assign channels among the plurality of base stations to minimize radio interference within the wireless communication system, by:

initially assigning channels among the plurality of base stations to minimize local radio interference; and reassigning the channels among the plurality of base stations to minimize system radio interference.

20. The computer readable medium of claim 19, further comprising a fifth set of instructions that, when executed by the wireless communication system, cause the wireless communication system to, for each loading period, operate the wireless communication system according to a determined channel assignment.

21. The computer readable medium of claim 19, wherein system radio interference is determined according to the equation:

$$i/c_{System} = \frac{\sum_i \sum_k A_{i,k} * i/c_{i,k}}{\sum_i \sum_k A_{i,k}}$$

where $A_{i,k}$ is the offered traffic generated on frequency k in cell i and $i/c_{i,k}$ is the actual radio interference level existing in the wireless communication system on frequency k in cell i.

22. The computer readable medium of claim 19, wherein a plurality of loading intervals forms a loading interval sequence.

23. The computer readable medium of claim 22, wherein the loading interval sequence is repeated for weekdays.

24. The computer readable medium of claim 22, wherein the loading interval sequence is repeated for weekend days.

25. The computer readable medium of claim 19, wherein at least one of the base stations supports a plurality of sectors and execution of the fourth set of instructions of the computer readable medium causes the wireless communication system to:

assign channels among the plurality of sectors of the at least one base station to minimize radio interference within the wireless communication system.

26. The computer readable medium of claim 19, wherein, in estimating a loading for each of the plurality of base stations, historical loading patterns are employed.

27. The computer readable medium of claim 19, wherein in assigning channels among the plurality of base stations, execution of the fourth set of instructions of the computer readable medium causes the wireless communication system to minimize radio interference within the wireless communication system considering radio propagation and base station positions are employed.

* * * * *